United States Patent [19]

Tsuchida

[11] Patent Number: 5,046,833
[45] Date of Patent: Sep. 10, 1991

[54] ZOOM LENS SYSTEM
[75] Inventor: Hirofumi Tsuchida, Tokyo, Japan
[73] Assignee: Olympus Optical Co., Ltd., Tokyo, Japan
[21] Appl. No.: 407,956
[22] Filed: Sep. 15, 1989
[30] Foreign Application Priority Data
  Sep. 16, 1988 [JP] Japan .................... 63-229788
[51] Int. Cl.$^5$ .............. G02B 15/14; G02B 13/04; G02B 13/18
[52] U.S. Cl. ................ 359/654; 359/683; 359/708
[58] Field of Search ............ 350/413, 432, 427, 469

[56] References Cited
FOREIGN PATENT DOCUMENTS
58-220115 12/1983 Japan .
60-218614 11/1985 Japan .
61-9607 3/1986 Japan .
0231517 10/1986 Japan .................... 350/413
62-153909 7/1987 Japan .

Primary Examiner—Bruce Y. Arnold
Assistant Examiner—Rebecca D. Gass
Attorney, Agent, or Firm—Cushman, Darby & Cushman

[57] ABSTRACT

A high performance, compact, light-weight zoom lens system manufacturable at a low cost consisting of a plural number of lens units and so adapted as to perform zooming by varying airspace(s) reserved between the lens units, said zoom lens system comprising, in the order from the object side, a first lens unit having negative refractive power, an aperture stop arranged on the image side of said first lens unit, and at least one radial GRIN lens component arranged on the image side of said aperture stop, having a concave shape and having positive power.

7 Claims, 13 Drawing Sheets

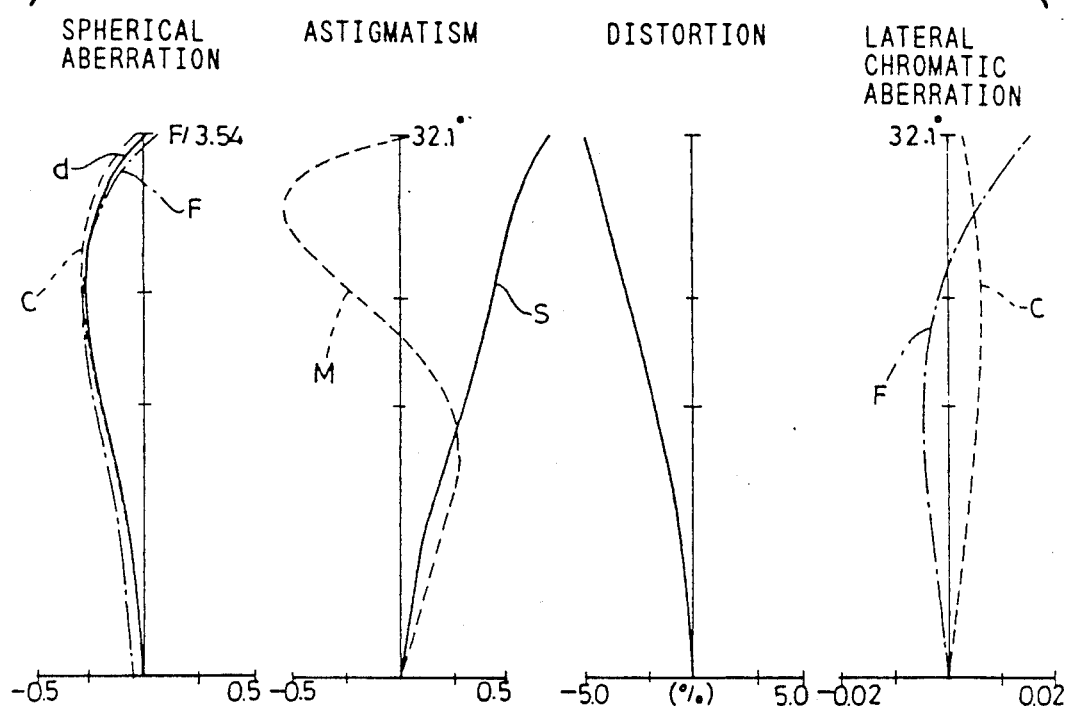
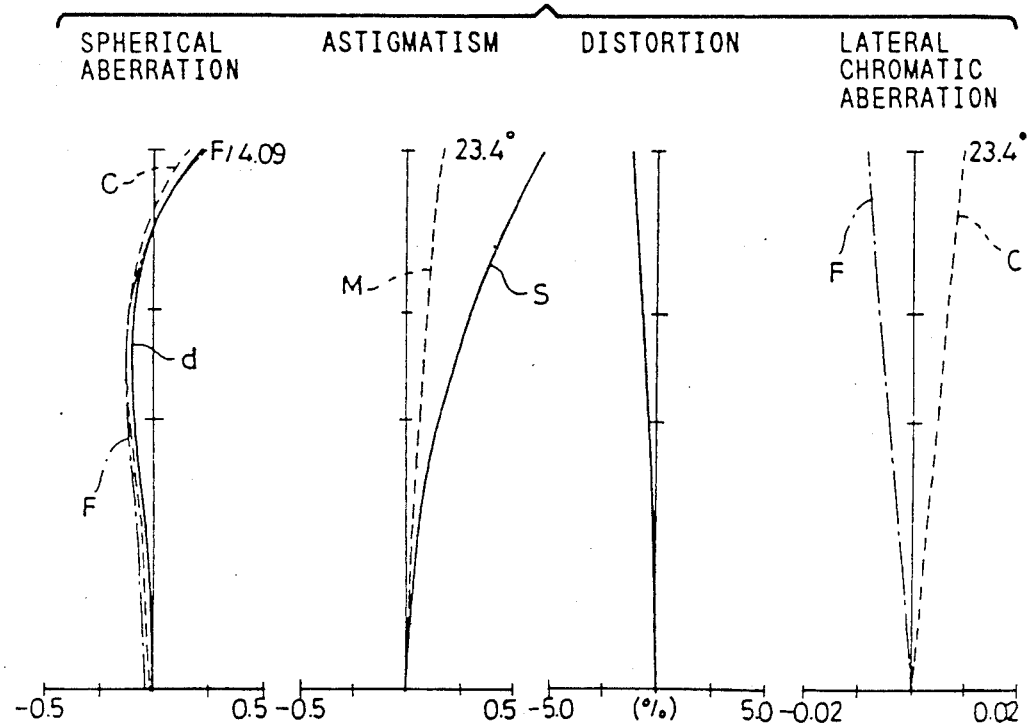

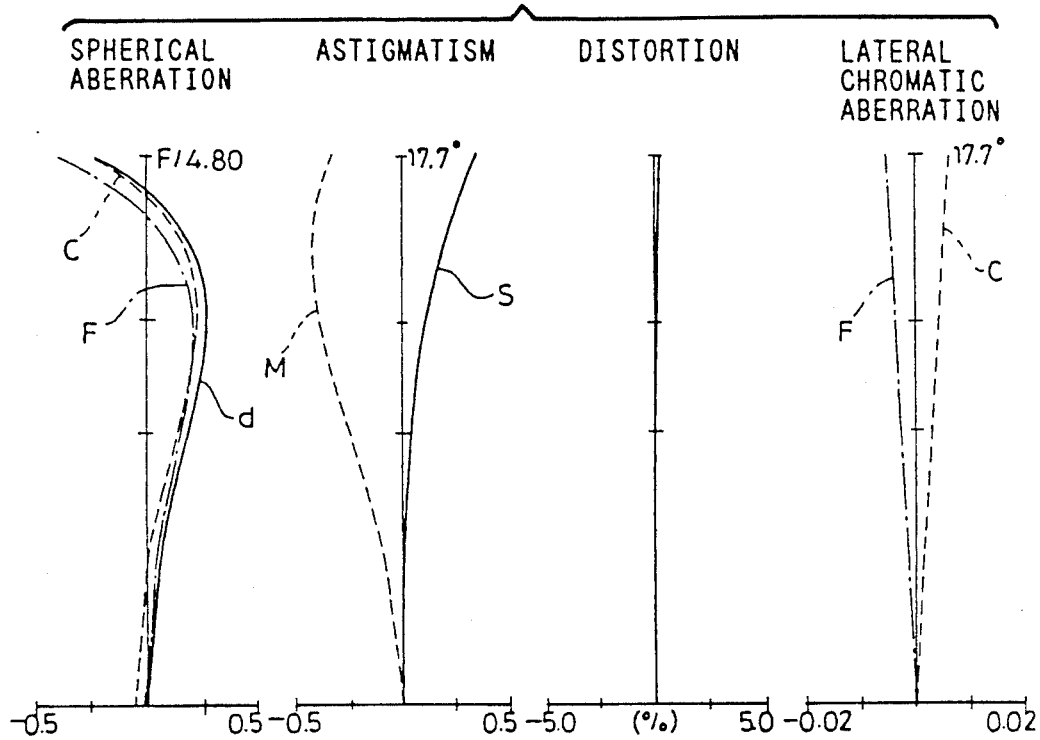
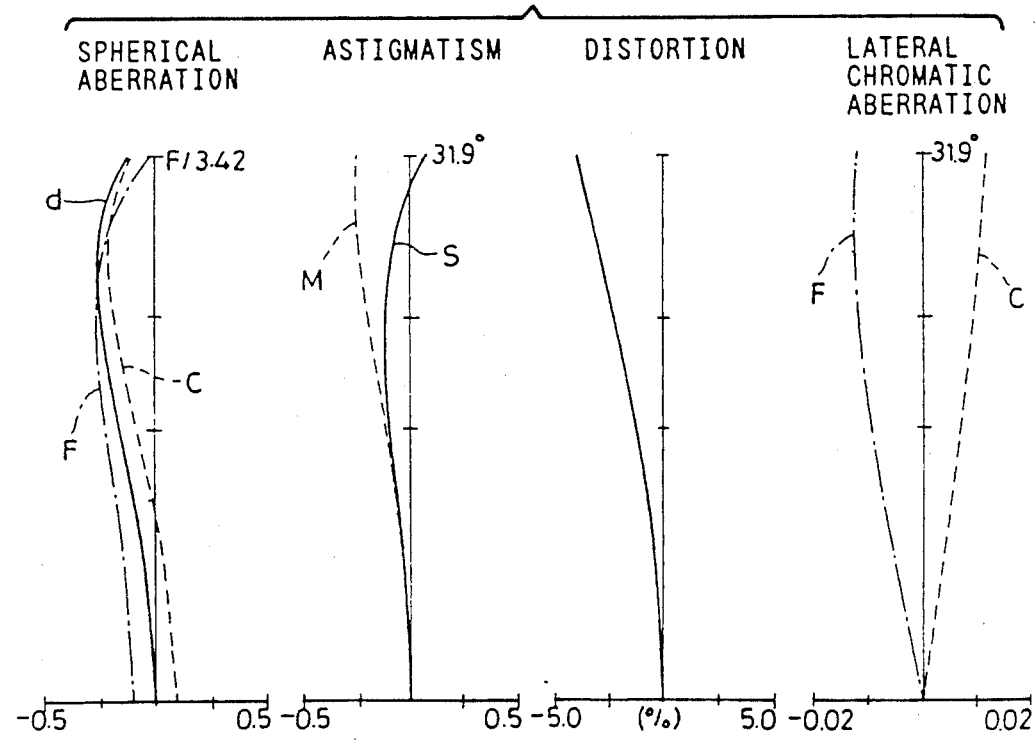

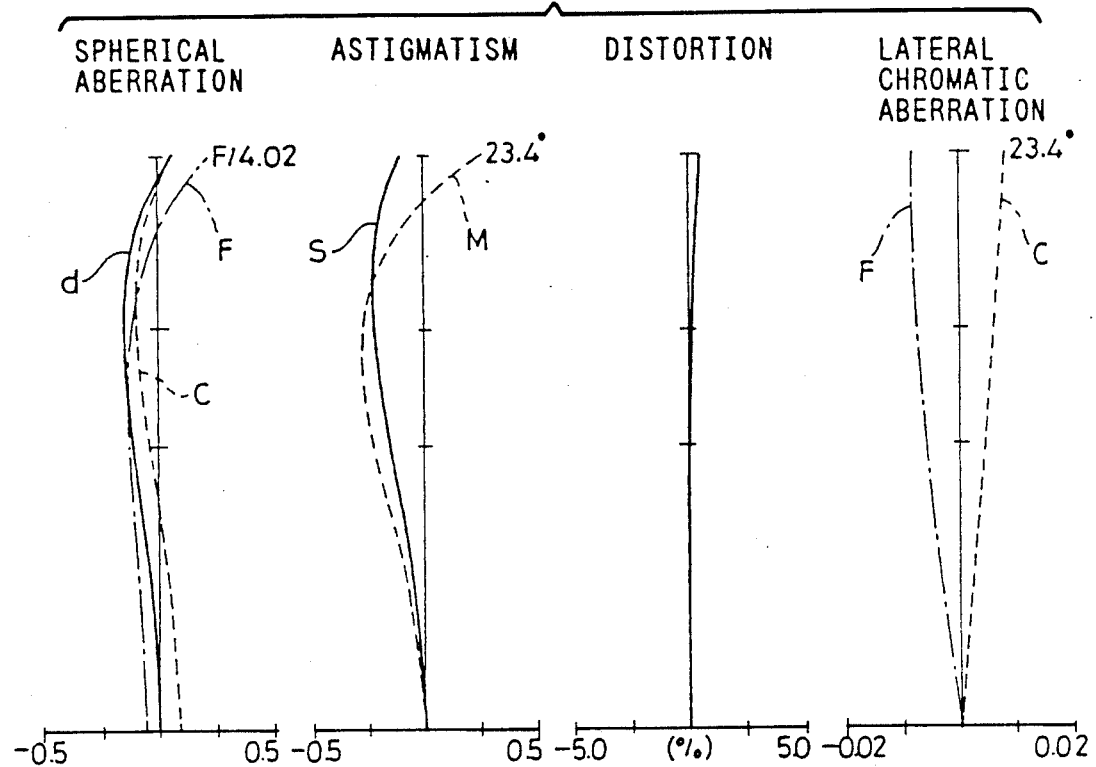
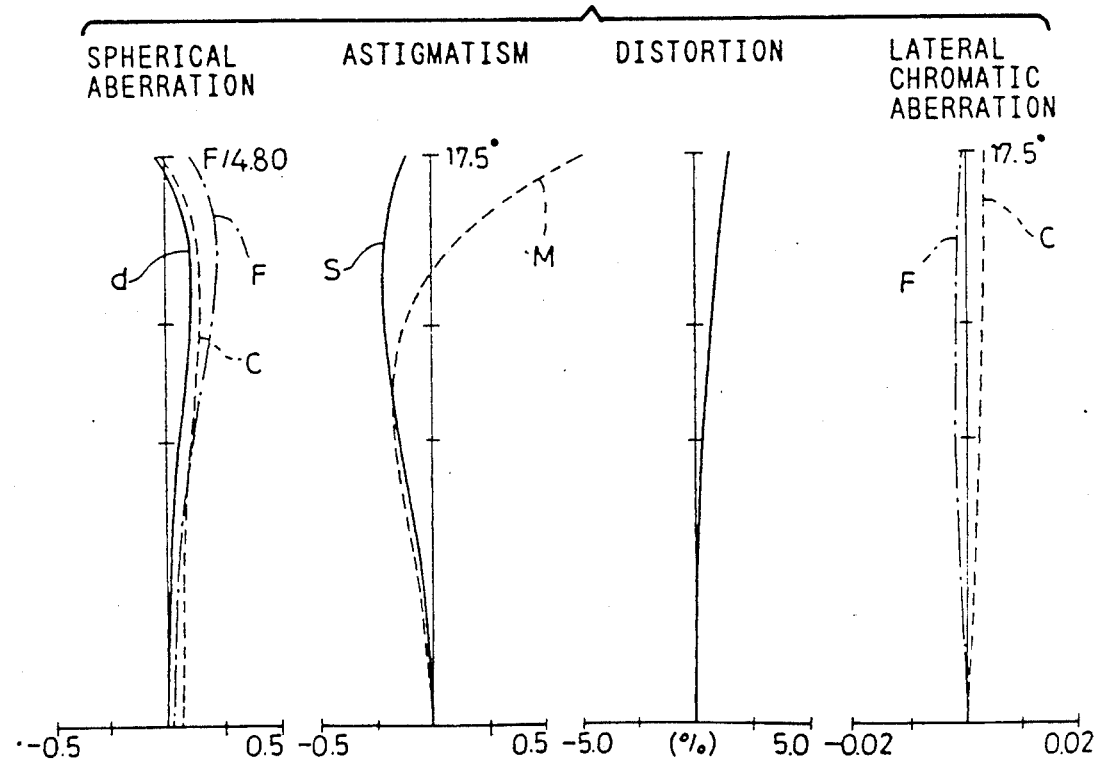

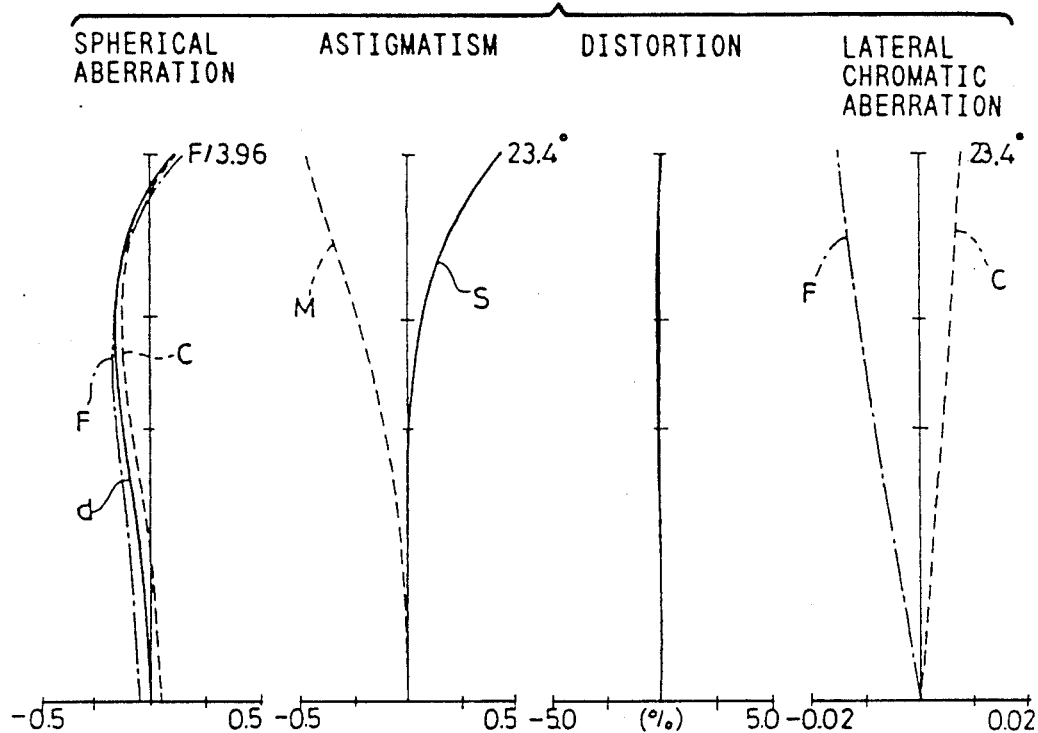
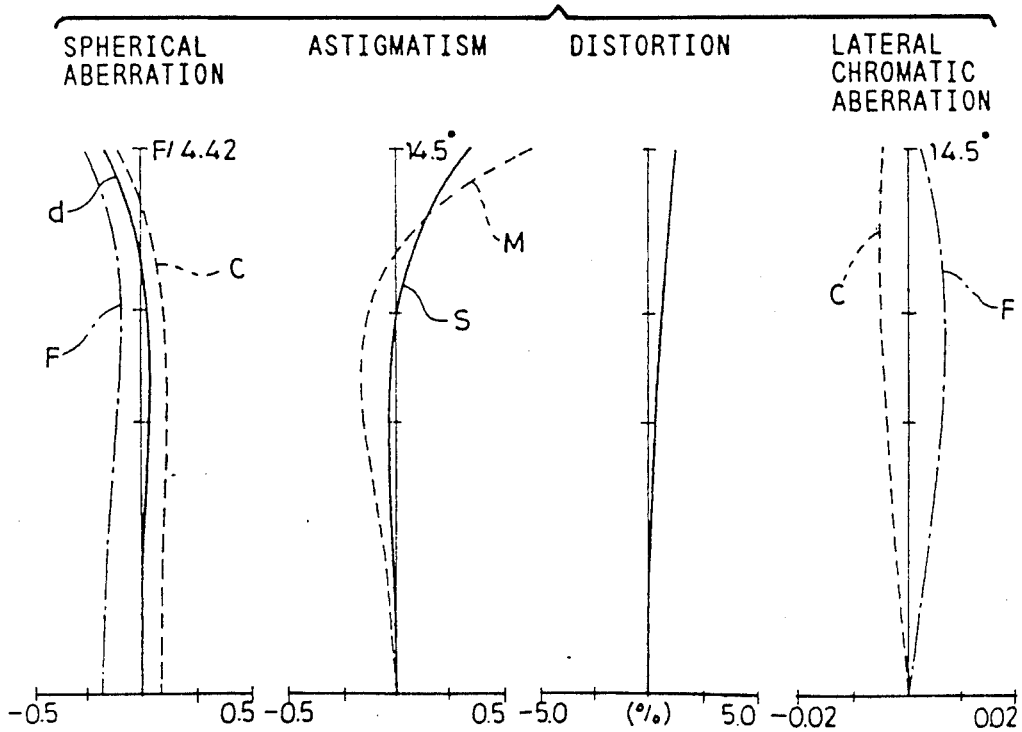

ZOOM LENS SYSTEM

BACKGROUND OF THE INVENTION a) Field of the Invention

The present invention relates to a zoom lens system for use with photographic cameras and so on.

b) Description of the Prior Art

In the recent years, zoom lens systems are generally used as lens systems for photographic camera since the zoom lens systems have merits to permit changing image sizes relatively freely and allow photographing variations in broad ranges. Though most of the zoom lens systems are currently designed for vari-focal ratios of 2 to 3, it is anticipated that zoom lens systems having higher vari-focal ratios of 4 to 6 will hereafter be demanded. As a vari-focal ratio becomes higher, however, a zoom lens system comprises a larger number of lens elements and has larger dimensions, thereby increasing weight thereof and enhancing manufacturing cost therefor.

In addition to homogenous spherical lens elements, homogenous aspherical lens elements and graded refractive index lens elements (GRIN lenses) are used for composing zoom lens systems. Since these homogenous aspherical lens elements and GRIN lenses have higher flexibility for correcting aberrations than the homogenous spherical lens elements, it is possible by using the homogenous aspherical lens elements and GRIN lenses to reduce numbers of lens elements composing zoom lens systems, thereby making zoom lens systems compacter, lighter in weights and manufacturable at lower costs.

As examples of lens systems using aspherical lens elements which have already been put to practical use, there are known the optical pickup single-element lens components and the lens systems for compact cameras composed of four groups of four lens elements such as that disclosed by Japanese Examined Published Patent Application No. 9607/61.

The graded refractive index lenses are classified into the so-called axial GRIN lens having refractive index gradient in the direction along the optical axis and the so-called radial GRIN lens having refractive index gradient in the direction perpendicular to the optical axis. Out of these GRIN lenses, especially the radial GRIN lens is capable, when used as a single lens element, of correcting Petzval's sum and chromatic aberration which cannot be corrected with a single homogenous lens element as reported by Applied Optics Vol. 7, No. 7 page 1081, Applied Optics Vol. 21, No. 6, page 992 and so on.

As examples of the lens systems using the radial GRIN lenses, there are known the lens systems disclosed by Japanese Unexamined Published Patent Applications No. 220115/58 and No. 218614/60. These lens systems comprise lens elements in numbers far smaller than those of the lens elements used in the lens systems composed only of homogenous spherical lens elements. However, the lens systems disclosed by the above-mentioned patent Applications have not been put to practical use yet since the GRIN lenses used therein have problems from the viewpoint of manufacturing.

In order to put the GRIN lenses to practical use, it is necessary to solve the problems on manufacturing and conceive some ways of efficient employment which can sufficiently make use of the characteristics of the GRIN lenses.

SUMMARY OF THE INVENTION

A primary object of the present invention is to provide a zoom lens system having aberrations corrected favorably by moderating asymmetry of the zoom lens system as a whole with graded refractive index lens components.

Another object of the present invention is to provide a compact light-weight zoom lens system comprising a small number of lens elements.

The zoom lens system according to the present invention is composed of a plural number of lens units and so adapted as to be zoomed by varying at least one of the airspaces reserved between the respective pairs of the lens units, the first lens unit arranged on the extremely object side out of these lens units being so designed as to have negative refractive power, an aperture stop being arranged on the image side of said first lens unit, and said zoom lens system comprising at least one graded refractive index lens component which is arranged o the image side of said stop, having a meniscus concave shape concave on the object side and having positive refractive power as a whole. Said concave shape means that the central portion of the lens component on the optical axis is thinner than the marginal portion thereof. The GRIN lens components used in the zoom lens system according to the present invention are of the radial GRIN lens that has high potential for correction of aberration among the GRIN lenses.

When the radial GRIN lens is to be applied to a lens system, it is impossible to obtain a lens system accomplishing an object simply by replacing, in a lens system composed only of homogenous lens elements, one or some of the lens elements with a GRIN lens.

When the radial GRIN lens is applied as the variator in a zoom lens system, for example, the angles of incidence of rays on the variator are changed by zooming, thereby making it difficult to correct aberrations of all the rays incident at the different angles or to correct aberrations favorably with a small number of lens elements.

Even in case of a zoom lens system, however, wherein the radial GRIN lens is applied to a relay lens system thereof on which angles of incidence are varied little by zooming, it is sufficient to correct aberrations only for certain specific rays and it is easy to correct aberrations favorably.

It is anticipated that field angle is wider at the wide position as a zoom lens system has a higher vari-focal ratio. Especially in case of a zoom lens system having a field angle of 70° or wider, it is desirable to design the first lens unit arranged on the extremely object side so as to have negative refractive power for facilitating to correct aberrations at the wide position and prolong back focal length.

For a zoom lens system comprising a first lens unit having negative refractive power, it is general to select a fundamental composition consisting of two lens units, i.e., a negative lens unit and a positive lens unit in the order from the object side, or a fundamental composition consisting of four lens units, i.e., a negative lens unit, a positive lens unit, a negative lens unit and a positive lens unit in the order from the object side. Since the first lens unit has the negative refractive power in either of the fundamental compositions, the zoom lens system is of the retrofocus type or an asymmetrical system as a whole consisting of the first negative lens unit and the lens unit(s) having the positive refractive power as a whole arranged on the image side of the first lens unit. It is important to correct the astigmatism, coma, distortion and so on which are produced due to the asymmetrical composition of the zoom lens system. A large number of lens elements are required for correcting these offaxial aberrations.

The present invention applies the radial GRIN lens components efficiently in the zoom lens system wherein the first lens unit ha the negative refractive power.

In order to correct astigmatism, coma, distortion and so on in the lens system, it is desirable to design the lens system so as to be symmetrical with regard to an aperture stop, like the Gaussian type or Hologon type and arrange the lens elements thereof concentrically.

In case of the zoom lens system wherein the first lens unit have the negative refractive power as described above, however, it is difficult to arrange the lens elements symmetrically with regard to the stop since the lens unit having the negative power is arranged on the object side of the stop and the lens unit(s) having the positive power is arranged on the image side of the stop.

The zoom lens system according to the present invention so adapted as to have a composition nearly symmetrical with regard to the aperture stop by arranging, on the image side of the aperture stop, a radial GRIN lens component having the meniscus concave shape concave on the object side and positive power for correcting the offaxial aberrations. This design has made it possible to correct the offaxial aberrations. Further, by arranging the radial GRIN lens component on the image side of the aperture stop, it is possible to prevent the angles of the rays passing through the radial GRIN lens component relative to the optical axis from being changed so much by zooming and provide an advantage for correction of aberrations.

The power of the radial GRIN lens component can be divided into the power produced by the surface thereof and the power produced by refractive index distribution of medium thereof. The aberrations produced when rays are refracted by the power produced by the refractive index distribution, out of the powers described above, can be made smaller than the aberrations produced by the surface by properly selecting a profile of the refractive index distribution. When the zoom lens system is composed as described above, it is therefore possible to balance the extremely object side negative lens unit with the lens component having the concave shape arranged on the image side of the aperture stop so as to moderate the asymmetry with regard to the aperture stop, and reduce the aberrations in the zoom lens system as a whole. The aberrations produced by the refractive index distribution, on the other hand, can be reduced by selecting a profile of refractive index distribution so as to minimize production of aberrations. Accordingly, it is possible to reduce the aberrations to very low degrees in the zoom lens system as a whole.

The radial GRIN lens component should desirably have positive power since said lens component is used in a positive lens unit arranged on the image side of the aperture stop. If the GRIN lens component has negative power, the positive power of the lens unit arranged on the image side will undesirably be weakened.

It is desirable to design the radial GRIN lens component having the concave shape and the positive power to be used in the zoom lens system according to the present invention so as to satisfy the following conditions (1) and (2):

$$|\phi_s/\phi_w| < 1 \quad (1)$$

$$|\Delta_u| < 10° \quad (2)$$

wherein the reference symbol $\phi_s$ represents power to be produced by the surface of said radial GRIN lens component, the reference symbol $\phi_w$ designates power at the wide position of the zoom lens system as a whole and the reference symbol $\Delta_u$ denotes angle of deviation of the principal ray to attain to 0.7 times of the maximum image height at the wide position when it is refracted by the radial GRIN lens.

The condition (1) defines the power to be produced by the surface of said radial GRIN lens component. If the upper limit of the condition (1) is exceeded, the power produced by the surface of the radial GRIN lens component will be too strong and the power produced by the refractive index distribution will also be strong, thereby losing the balance between the axial aberrations and the offaxial aberrations, and degrading performance of the zoom lens system.

The condition (2) defines angle of deviation of the principal ray to attain to 0.7 times of the maximum image height at the wide position when it is refracted by said radial GRIN lens component, and is required for arranging the radial GRIN lens component concentrically with the aperture stop. If the upper limit of the condition (2) is exceeded, the symmetry of the zoom lens system will be lost, thereby undesirably aggravating astigmatism, coma and distortion.

Further, as is reported by the literatures mentioned above, it is possible to correct chromatic aberration and Petzval's sum by using the radial GRIN lens. Since the radial GRIN lens component having the concave shape and positive power used in the zoom lens system according to the present invention has negative power on the surface thereof, refraction on the surface serves for providing a further advantage to correct chromatic aberration and Petzval's sum.

BRIEF DESCRIPTION OF THE DRAWINGS

FIG. 6 through FIG. 8 show curves illustrating aberration characteristics of the Embodiment 1 of the present invention;

FIG. 9 through FIG. 11 show curves illustrating aberration characteristics of the Embodiment 2 of the present invention;

FIG. 15 through FIG. 17 show curves illustrating aberration characteristics of the Embodiment 4 of the present invention.

DESCRIPTION OF THE PREFERRED EMBODIMENTS

Figure 1:
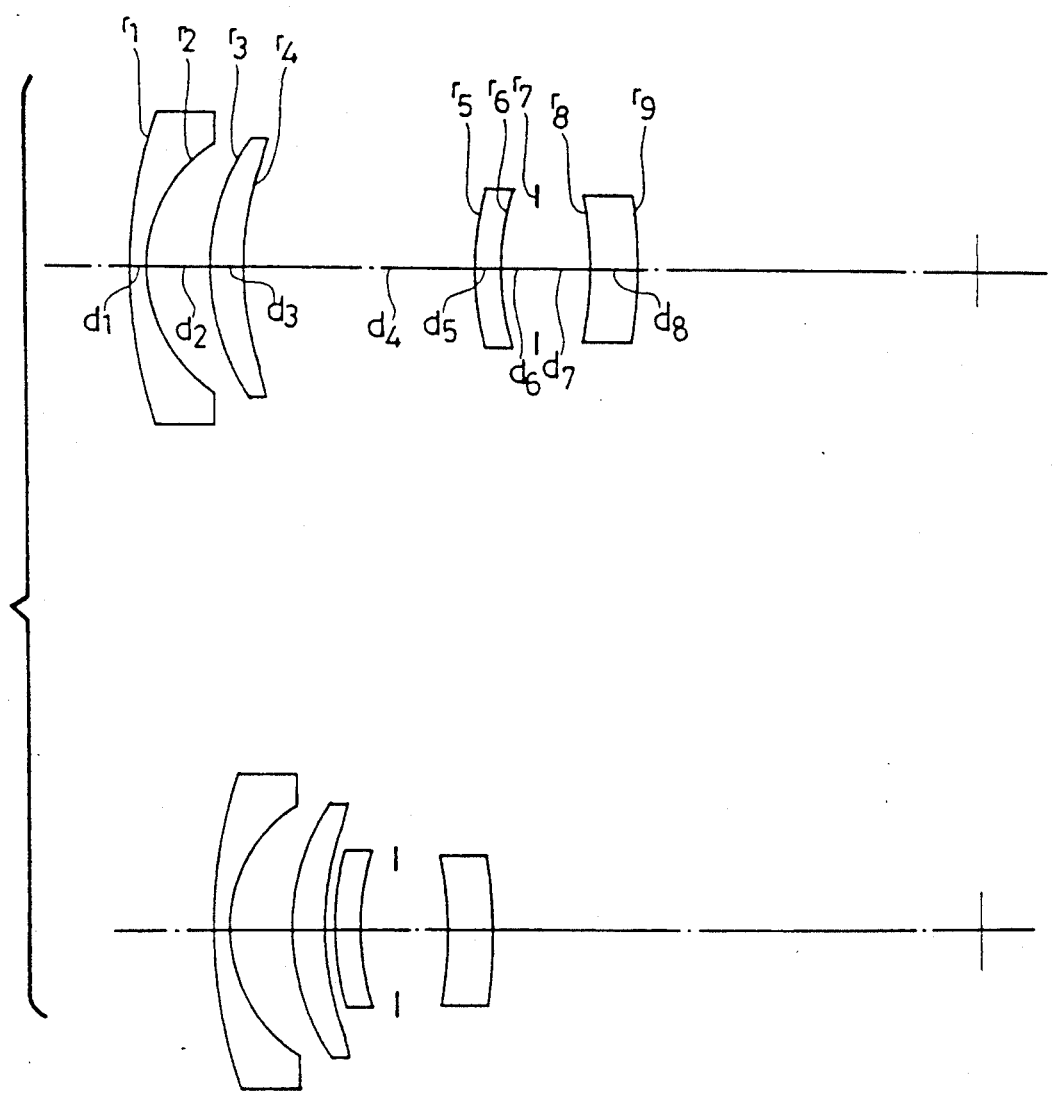
FIG. 1 through FIG. 5 show sectional views illustrating compositions of Embodiments 1 through 5 of the zoom lens system according to the present invention.

Now, the present invention will be described more detailedly below with reference to the preferred embodiments shown in the accompanying drawings and given in the following numerical data:

Embodiment 1

$f = 36.22 \sim 67.55$, F/3.54~4.8
maximum image height 21.6, $2\omega = 64.2° \sim 35.4°$ $r_1 = 61.8623$
$d_1 = 2.2000$  $n_{01} = 1.69680$  $\nu_{01} = 55.52$
$r_2 = 19.0466$
$d_2 = 8.6994$
$r_3 = 29.0644$
$d_3 = 4.6000$  $n_{02} = 1.78472$  $\nu_{02} = 25.68$
$r_4 = 38.3187$ (aspherical surface)
$d_4 = D_1$ (variable)
$r_5 = 35.2196$
$d_5 = 3.6182$  $n_{03} = 1.75520$  $\nu_{03} = 27.51$
$r_6 = 35.4007$
$d_6 = 4.8880$
$r_7 = \infty$ (stop)
$d_7 = 6.9481$
$r_8 = -48.8978$
$d_8 = 6.4536$  $n_{04} = 1.60311$  $\nu_{04} = 60.68$
$r_9 = -61.5815$ aspherical surface coefficient
$P = 0.3085$, $A_4 = -0.18117 \times 10^{-5}$
$A_6 = -0.20526 \times 10^{-7}$, $A_8 = 0$

| f | 36.22 | 50 | 67.55 |
|---|---|---|---|
| $D_1$ | 31.741 | 13.597 | 1.200 | graded refractive index lens ($n_{03}$)

| wavelength | $n_0$ | $n_1$ |
|---|---|---|
| 587.56 | 1.75520 | $-0.33831 \times 10^{-2}$ |
| 656.28 | 1.74728 | $-0.33826 \times 10^{-2}$ |
| 486.13 | 1.77473 | $-0.33842 \times 10^{-2}$ |
|  | $n_2$ | $n_3$ |
| 587.56 | $-0.27999 \times 10^{-5}$ | $-0.33556 \times 10^{-8}$ |
| 656.28 | $-0.28025 \times 10^{-5}$ | $-0.33751 \times 10^{-8}$ |
| 486.13 | $-0.27939 \times 10^{-5}$ | $-0.33100 \times 10^{-8}$ | graded refractive index lens ($n_{04}$)

| wavelength | $n_0$ | $n_1$ |
|---|---|---|
| 587.56 | 1.60311 | $-0.30614 \times 10^{-3}$ |
| 656.28 | 1.60008 | $-0.30661 \times 10^{-3}$ |
| 486.13 | 1.61002 | $-0.30504 \times 10^{-3}$ |
|  | $n_2$ | $n_3$ |
| 587.56 | $0.21966 \times 10^{-5}$ | $0.10235 \times 10^{-7}$ |
| 656.28 | $0.21912 \times 10^{-5}$ | $0.10160 \times 10^{-7}$ |
| 486.13 | $0.22092 \times 10^{-5}$ | $0.10410 \times 10^{-7}$ |

$|\phi_s/\phi_w| = 0.07$, $|\Delta_u| = 0.9°$

Embodiment 2

$f = 36.22 \sim 67.5$, F/3.42~4.8
maximum image height 21.6, $2\omega = 63.7° \sim 35.0°$ $r_1 = 39.8754$
$d_1 = 1.6000$  $n_{01} = 1.69680$  $\nu_{01} = 55.52$
$r_2 = 17.5754$
$d_2 = 7.6000$
$r_3 = -52.4620$
$d_3 = 1.4000$  $n_{02} = 1.69680$  $\nu_{02} = 55.52$
$r_4 = -99.1996$
$d_4 = 0.2000$
$r_5 = 23.3579$
$d_5 = 2.6000$  $n_{03} = 1.78472$  $\nu_{03} = 25.68$
$r_6 = 29.7418$
$d_6 = D_1$ (variable)
$r_7 = 26.5914$
$d_7 = 3.6000$  $n_{04} = 1.65160$  $\nu_{04} = 58.67$
$r_8 = -84.9482$
$d_8 = 1.2000$
$r_9 = \infty$ (stop)
$d_9 = 0.8000$
$r_{10} = 22.6771$
$d_{10} = 3.8000$  $n_{05} = 1.69350$  $\nu_{05} = 53.23$
$r_{11} = -42.7009$
$d_{11} = 1.0000$  $n_{06} = 1.74077$  $\nu_{06} = 27.79$
$r_{12} = 100.1443$
$d_{12} = 0.9500$
$r_{13} = -53.8168$
$d_{13} = 3.3958$  $n_{07} = 1.83400$  $\nu_{07} = 37.16$
$r_{14} = 19.0106$
$d_{14} = 2.0913$
$r_{15} = -286.4909$
$d_{15} = 2.8000$  $n_{08} = 1.72342$  $\nu_{08} = 38.03$
$r_{16} = -26.0144$
$d_{16} = D_2$ (variable)
$r_{17} = -20.0000$
$d_{17} = 2.2328$  $n_{09} = 1.52257$  $\nu_{09} = 60.07$
$r_{18} = -21.0000$

| f | 36.22 | 50 | 67.5 |
|---|---|---|---|
| $D_1$ | 22.817 | 9.856 | 1.000 |
| $D_2$ | 2.800 | 11.918 | 23.535 | graded refractive index lens ($n_{09}$)

| wavelength | $n_0$ | $n_1$ | $n_2$ |
|---|---|---|---|
| 587.56 | 1.52257 | $-0.33607 \times 10^{-3}$ | $-0.23307 \times 10^{-6}$ |
| 656.28 | 1.51991 | $-0.33380 \times 10^{-3}$ | $-0.23307 \times 10^{-6}$ |
| 486.13 | 1.52861 | $-0.34138 \times 10^{-3}$ | $-0.23307 \times 10^{-6}$ |

$|\phi_s/\phi_w| = 0.01$, $|\Delta_u| = 0.8°$

Embodiment 3

$f = 28.98 \sim 101.33$, F/3.6~4.8
maximum image height 21.6, $2\omega = 75.5° \sim 23.4°$ $r_1 = 63.3661$
$d_1 = 2.0000$  $n_{01} = 1.77250$  $\nu_{01} = 49.66$
$r_2 = 32.0255$
$d_2 = 7.0000$
$r_3 = 936.7218$
$d_3 = 6.0000$  $n_{02} = 1.76180$  $\nu_{02} = 27.11$
$r_4 = -61.9847$
$d_4 = 0.2000$  $n_{03} = 1.77250$  $\nu_{03} = 49.66$
$r_5 = 64.6877$
$d_5 = D_1$ (variable)
$r_6 = 45.8395$
$d_6 = 16.4968$  $n_{04} = 1.60311$  $\nu_{04} = 60.70$
$r_7 = -29.5070$
$d_7 = 1.8000$  $n_{05} = 1.78472$  $\nu_{05} = 25.68$
$r_8 = -68.5169$
$d_8 = 0.2000$
$r_9 = 27.8886$
$d_9 = 4.8634$  $n_{06} = 1.60311$  $\nu_{06} = 60.70$
$r_{10} = -1774.3579$
$d_{10} = D_2$ (variable)
$r_{11} = \infty$ (stop)
$d_{11} = 2.2000$
$r_{12} = -141.8576$
$d_{12} = 2.8000$  $n_{07} = 1.80518$  $\nu_{07} = 25.43$
$r_{13} = -44.4327$
$d_{13} = 1.4000$  $n_{08} = 1.77250$  $\nu_{08} = 49.66$
$r_{14} = 37.6475$
$d_{14} = D_3$ (variable)
$r_{15} = -33.3118$
$d_{15} = 4.3769$  $n_{09} = 1.60311$  $\nu_{09} = 60.68$
$r_{16} = -74.6212$

| f | 28.98 | 54.5 | 101.33 |
|---|---|---|---|
| $D_1$ | 53.960 | 20.131 | 1.200 |
| $D_2$ | 1.800 | 5.027 | 12.358 |
| $D_3$ | 14.966 | 9.312 | 3.600 | graded refractive index lens ($n_{09}$)

| wavelength | $n_0$ | $n_1$ | $n_2$ |
|---|---|---|---|
| 587.56 | 1.60311 | $-0.18096 \times 10^{-2}$ | $0.46499 \times 10^{-5}$ |
| 656.28 | 1.60008 | $-0.18060 \times 10^{-2}$ | $0.45879 \times 10^{-5}$ |
| 486.13 | 1.61002 | $-0.18181 \times 10^{-2}$ | $0.47946 \times 10^{-5}$ |

$|\phi_s/\phi_w| = 0.28$, $|\Delta_u| = 2.2°$

Embodiment 4

| f = 28.84~82.45, F/3.63~4.42 |
|---|
| maximum image height 21.6, $2\omega = 76.0° \sim 29.0°$ |

| | | | |
|---|---|---|---|
| $r_1 = 180.4915$ | | | |
| | $d_1 = 2.2000$ | $n_{01} = 1.77250$ | $\nu_{01} = 49.66$ |
| $r_2 = 34.6951$ | | | |
| | $d_2 = 6.0000$ | | |
| $r_3 = 274.1746$ | | | |
| | $d_3 = 5.4000$ | $n_{02} = 1.78472$ | $\nu_{02} = 25.68$ |
| $r_4 = -68.6424$ | | | |
| | $d_4 = 0.2000$ | | |
| $r_5 = -93.2278$ | | | |
| | $d_5 = 2.0000$ | $n_{03} = 1.77250$ | $\nu_{03} = 49.66$ |
| $r_6 = 54.1957$ | | | |
| | $d_6 = 0.2000$ | | |
| $r_7 = 30.8469$ | | | |
| | $d_7 = 3.4000$ | $n_{04} = 1.80518$ | $\nu_{04} = 25.43$ |
| $r_8 = 34.9983$ | | | |
| | $d_8 = D_1$ (variable) | | |
| $r_9 = 43.6433$ | | | |
| | $d_9 = 1.4000$ | $n_{05} = 1.83400$ | $\nu_{05} = 37.16$ |
| $r_{10} = 20.3149$ | | | |
| | $d_{10} = 8.0000$ | $n_{06} = 1.69350$ | $\nu_{06} = 53.23$ |
| $r_{11} = -33.4371$ | | | |
| | $d_{11} = 0.3000$ | | |
| $r_{12} = -33.0543$ | | | |
| | $d_{12} = 1.4000$ | $n_{07} = 1.75520$ | $\nu_{07} = 27.51$ |
| $r_{13} = -112.8737$ | | | |
| | $d_{13} = 0.2000$ | | |
| $r_{14} = 31.4310$ | | | |
| | $d_{14} = 4.2000$ | $n_{08} = 1.61700$ | $\nu_{08} = 62.79$ |
| $r_{15} = \infty$ | | | |
| | $d_{15} = D_2$ (variable) | | |
| $r_{16} = \infty$ (stop) | | | |
| | $d_{16} = 2.0000$ | | |
| $r_{17} = -91.3712$ | | | |
| | $d_{17} = 2.6000$ | $n_{09} = 1.80518$ | $\nu_{09} = 25.43$ |
| $r_{18} = -30.6029$ | | | |
| | $d_{18} = 1.2000$ | $n_{010} = 1.74100$ | $\nu_{010} = 52.68$ |
| $r_{19} = 29.5275$ | | | |
| | $d_{19} = D_3$ (variable) | | |
| $r_{20} = -35.2190$ | | | |
| | $d_{20} = 3.3280$ | $n_{011} = 1.80518$ | $\nu_{011} = 25.43$ |
| $r_{21} = -39.7446$ | | | |
| | $d_{21} = D_4$ (variable) | | |
| $r_{22} = 161.2869$ | | | |
| | $d_{22} = 3.6000$ | $n_{012} = 1.48749$ | $\nu_{012} = 70.20$ |
| $r_{23} = -99.5863$ | | | |

| f | 28.84 | 50 | 82.45 |
|---|---|---|---|
| $D_1$ | 41.575 | 15.107 | 1.400 |
| $D_2$ | 2.200 | 9.214 | 19.203 |
| $D_3$ | 20.011 | 12.005 | 3.000 |
| $D_4$ | 0.448 | 8.454 | 17.459 | graded refractive index lens ($n_{011}$)

| wavelength | $n_0$ | $n_1$ |
|---|---|---|
| 587.56 | 1.80518 | $-0.25398 \times 10^{-2}$ |
| 656.28 | 1.79609 | $-0.25398 \times 10^{-2}$ |
| 486.13 | 1.82775 | $-0.25398 \times 10^{-2}$ |
| | $n_2$ | $n_3$ |
| 587.56 | $0.14022 \times 10^{-5}$ | $0.15275 \times 10^{-8}$ |
| 656.28 | $0.14022 \times 10^{-5}$ | $0.15275 \times 10^{-8}$ |
| 486.13 | $0.14022 \times 10^{-5}$ | $0.15275 \times 10^{-8}$ | graded refractive index lens ($n_{012}$)

| wavelength | $n_0$ | $n_1$ |
|---|---|---|
| 587.56 | 1.48749 | $0.31010 \times 10^{-3}$ |
| 656.28 | 1.48535 | $0.31010 \times 10^{-3}$ |
| 486.13 | 1.49229 | $0.31010 \times 10^{-3}$ |
| | $n_2$ | $n_3$ |
| 587.56 | $-0.29196 \times 10^{-6}$ | $-0.37381 \times 10^{-9}$ |
| 656.28 | $-0.29196 \times 10^{-6}$ | $-0.37381 \times 10^{-9}$ |
| 486.13 | $-0.29196 \times 10^{-6}$ | $-0.37381 \times 10^{-9}$ |

$|\phi_s/\phi_w| = 0.05$, $|\Delta_u| = 6.8°$

Embodiment 5

| f = 8.0~16.0, F/2.8~3.22 |
|---|
| maximum image height 4, $2\omega = 53.8° \sim 28.2°$ |

| | | | |
|---|---|---|---|
| $r_1 = 42.7726$ (aspherical surface) | | | |
| | $d_1 = 2.8000$ | $n_{01} = 1.49216$ | $\nu_{01} = 57.50$ |
| $r_2 = 8.1009$ (aspherical surface) | | | |
| | $d_2 = 4.5541$ | | |
| $r_3 = 9.8093$ | | | |
| | $d_3 = 3.0000$ | $n_{02} = 1.58320$ | $\nu_{02} = 30.45$ |
| $r_4 = 12.2101$ | | | |
| | $d_4 = D_1$ (variable) | | |
| $r_5 = \infty$ (stop) | | | |
| | $d_5 = D_2$ (variable) | | |
| $r_6 = 26.2058$ | | | |
| | $d_6 = 5.8782$ | $n_{03} = 1.64769$ | $\nu_{03} = 33.80$ |
| $r_7 = -229.2697$ | | | |
| | $d_7 = 1.6772$ | | |
| $r_8 = -6.4708$ | | | |
| | $d_8 = 5.3224$ | $n_{04} = 1.64769$ | $\nu_{04} = 33.80$ |
| $r_9 = -14.0523$ | | | | aspherical surface coefficient (1st surface)
$P = 1.0000$, $A_4 = 0.41845 \times 10^{-4}$
$A_6 = -0.34180 \times 10^{-6}$, $A_8 = 0.34932 \times 10^{-8}$ (2nd surface)
$P = 1.0000$, $A_4 = 0.20074 \times 10^{-5}$
$A_6 = -0.19971 \times 10^{-7}$, $A_8 = -0.22633 \times 10^{-7}$

| f | 8.0 | 11.0 | 16.0 |
|---|---|---|---|
| $D_1$ | 28.916 | 13.104 | 1.218 |
| $D_2$ | 7.405 | 5.855 | 3.273 | graded refractive index lens ($n_{03}$)

| wavelength | $n_0$ | $n_1$ | $n_2$ |
|---|---|---|---|
| 587.56 | 1.64769 | $-0.19099 \times 10^{-2}$ | $-0.20215 \times 10^{-4}$ |
| 656.28 | 1.64209 | $-0.19085 \times 10^{-2}$ | $-0.20215 \times 10^{-4}$ |
| 486.13 | 1.66125 | $-0.19132 \times 10^{-2}$ | $-0.20215 \times 10^{-4}$ | graded refractive index lens ($n_{04}$)

| wavelength | $n_0$ | $n_1$ | $n_2$ |
|---|---|---|---|
| 587.56 | 1.64769 | $-0.64312 \times 10^{-2}$ | $0.19960 \times 10^{-4}$ |
| 656.28 | 1.64209 | $-0.64210 \times 10^{-2}$ | $0.19972 \times 10^{-4}$ |
| 486.13 | 1.66125 | $-0.64550 \times 10^{-2}$ | $0.19931 \times 10^{-4}$ |

$|\phi_s/\phi_w| = 0.31$, $|\Delta_u| = 4.5°$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_{01}, n_{02}, \ldots$ denote refractive indices of the respective lens elements, and the reference symbols $\nu_{01}, \nu_{02}, \ldots$ represent Abbe's numbers of the respective lens elements.

The Embodiment 1 has the composition illustrated in FIG. 1 wherein the zoom lens system consists, in the order from the object side, a first lens unit having negative refractive power and a second lens unit having positive refractive power. The first negative lens unit consists of a negative lens component and a positive lens component having an aspherical surface on the image side. The positive second lens unit consists of two radial GRIN lens components both having positive powers. Out of these radial GRIN lens components, the image side lens component has a meniscus concave shape concave on the object side and positive power. That is to say, the Embodiment 1 is a zoom lens system comprising the first negative lens unit, an aperture stop arranged in the second lens unit located on the image side of said first lens unit, and the radial GRIN lens component which is arranged on the image side of the aperture stop, and has the concave shape and positive power.

Most of the conventional zoom lens systems designed for the same specifications as those of the Embodiment 1 of the present invention generally comprise three homogenous spherical lens components in the first lens unit thereof and four or five homogenous spherical lens components in the second lens unit thereof. When compared with these conventional zoom lens systems each comprising two lens units, the zoom lens system according to the present invention uses lens components in a number one smaller in the first lens unit thereof and lens component in a number two or three smaller in the second lens unit thereof. In order to correct aberrations favorably with a small number of lens components in a zoom lens system consisting of a negative lens unit and a positive lens unit, it is desirable to use an aspherical surface in the first lens unit and radial GRIN lens components in the second lens unit. When a radial GRIN lens component is used in the first lens unit, it is required to reserve a large difference in refractive index on the order of 0.3 between the lens center and marginal portion thereof, thereby undesirably producing a disadvantage from the viewpoint of manufacturing.

Aberration characteristics at the wide position, intermediate focal length and tele position of the Embodiment 1 are illustrated in FIG. 6, FIG. 7 and FIG. 8 respectively.

Figure 2:
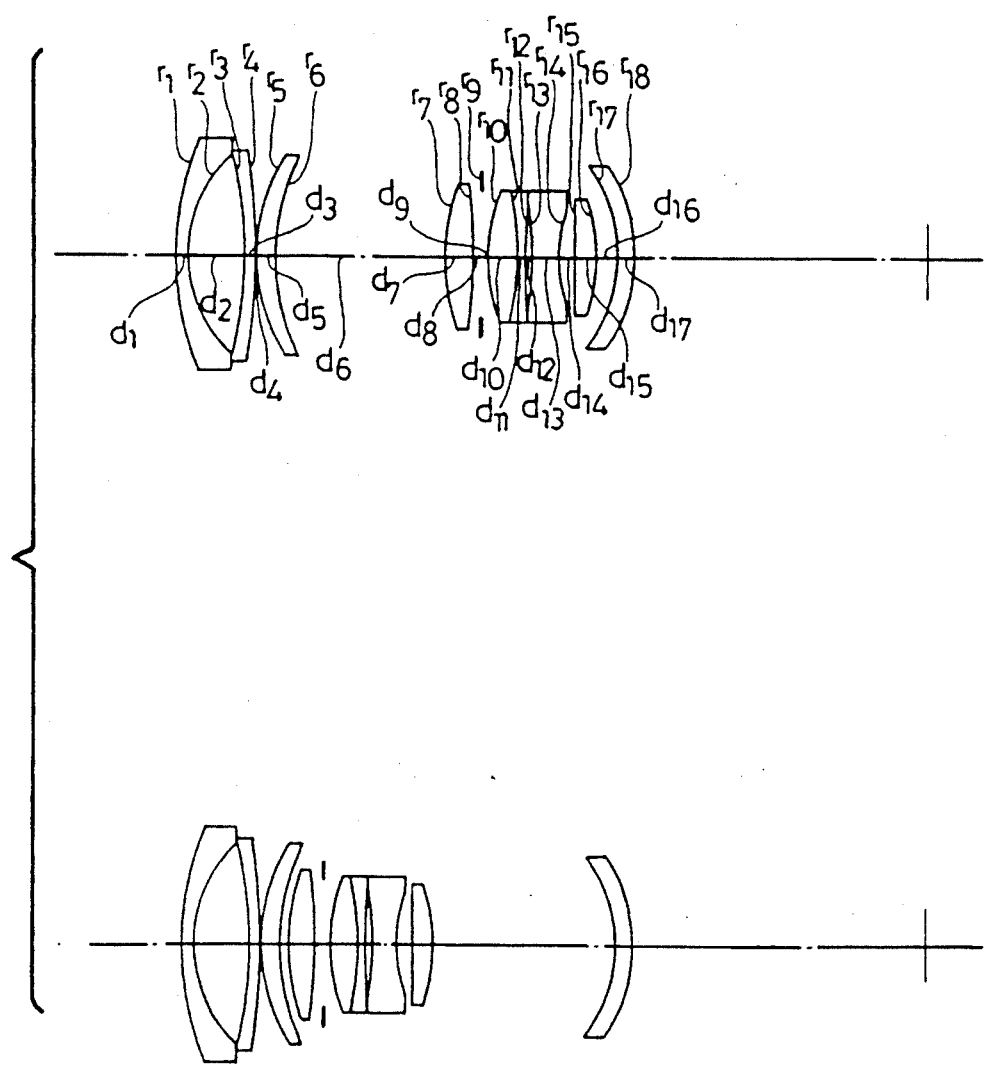

The Embodiment 2 has the composition shown in FIG. 2 wherein the zoom lens system fundamentally consists of a first negative lens unit and a second positive lens unit. However, the Embodiment 2 is different from the Embodiment 1 in that the former comprises a third lens unit which is fixed on the extremely image side and has weak positive power. The third lens unit consists of a radial GRIN lens component having said concave shape and positive power. That is to say, the Embodiment 2 is a zoom lens system comprising the first negative lens unit, an aperture stop arranged in the second lens unit located on the image side of said first lens unit, and the radial GRIN lens component which is arranged on the image side of the aperture stop, and has the concave shape and positive power.

The radial GRIN lens component having the concave shape and positive power is used as the so-called field flattener and serves for favorably correcting the offaxial aberrations, especially coma.

Owing to the adoption of the radial GRIN lens component, the Embodiment 2 favorably corrects the offaxial aberrations and a total length shortened by the positive power of the radial GRIN lens component.

Aberration characteristics at the wide position, intermediate focal length and tele position of the Embodiment 2 are illustrated in FIG. 9, FIG. 10 and FIG. 11 respectively.

Figure 3:
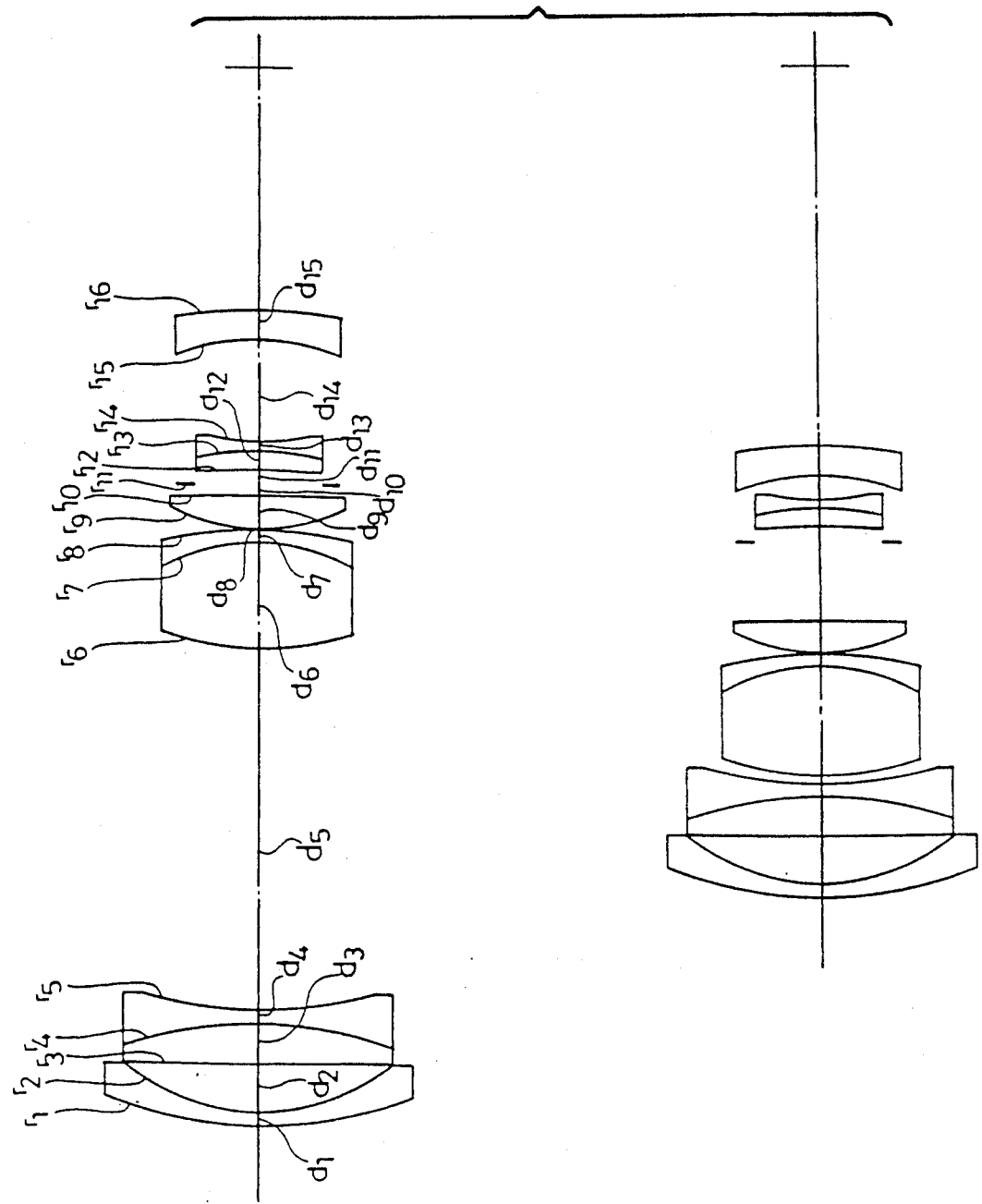

The Embodiment 3 has the composition illustrated in FIG. 3 wherein the zoom lens system consists, in the order from the object side, of a first negative lens unit, a second positive lens unit, a third negative lens unit and a fourth positive lens unit. In this zoom lens system, all the lens units are movable for zooming. In the Embodiment 3, the fourth lens unit is composed only of a radial GRIN lens component having the concave shape and positive power. That is to say, the Embodiment 3 comprises the first negative lens unit, an aperture stop arranged between the second lens unit and the third lens unit, and the fourth lens unit composed of the radial GRIN lens component having the concave shape.

Adoption of the radial GRIN lens having the concave shape and positive power has made it possible to compose the zoom lens system having a high specification for a zooming ratio of approximately 3.5 with lens elements in a number as small as nine.

Figure 12:
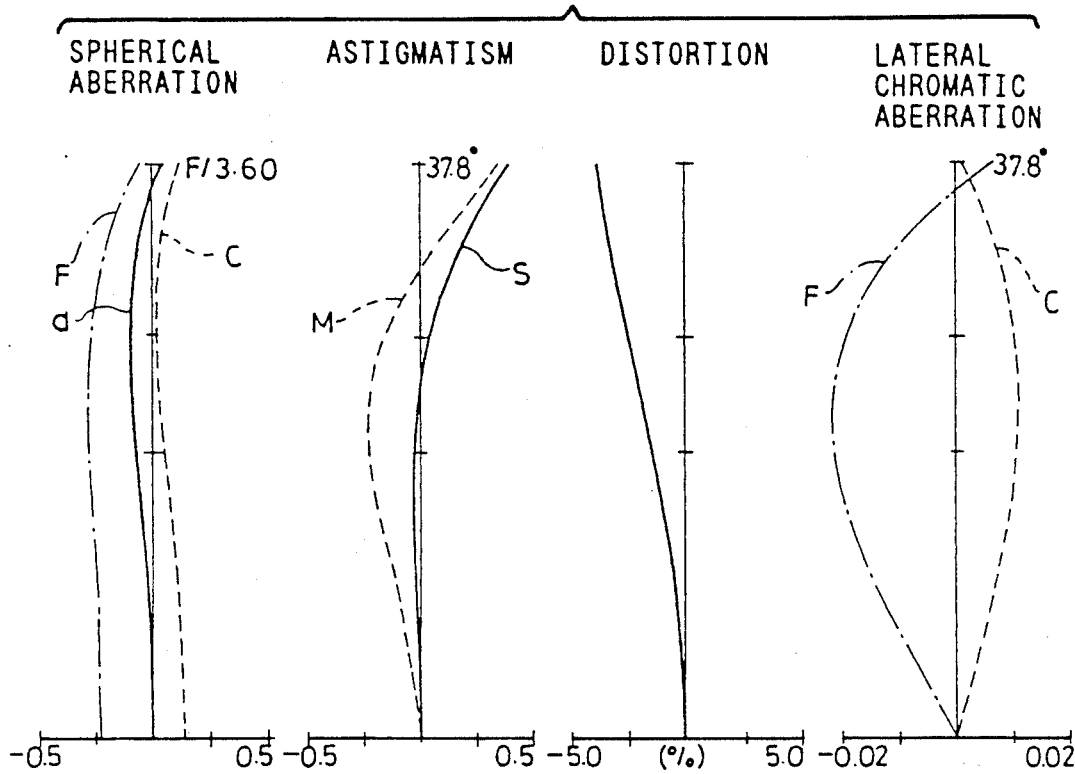
FIG. 12 through FIG. 14 show graphs illustrating aberration characteristics of the Embodiment 3 of the present invention.
Figure 13:
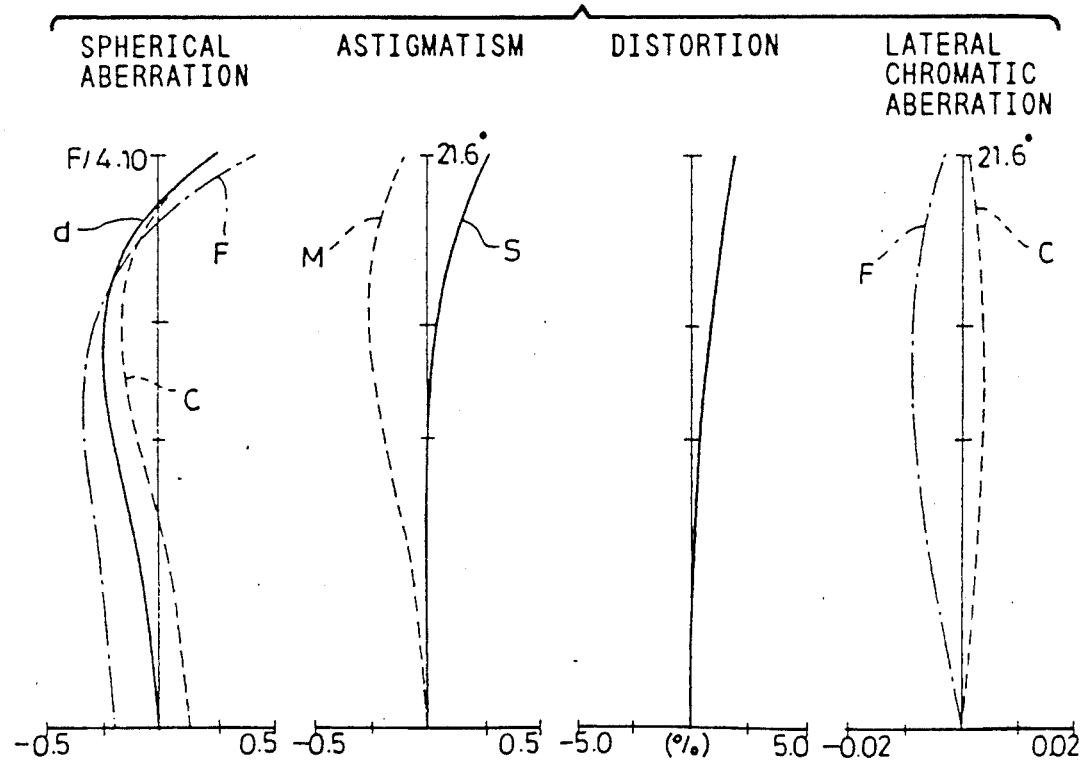
Figure 14:
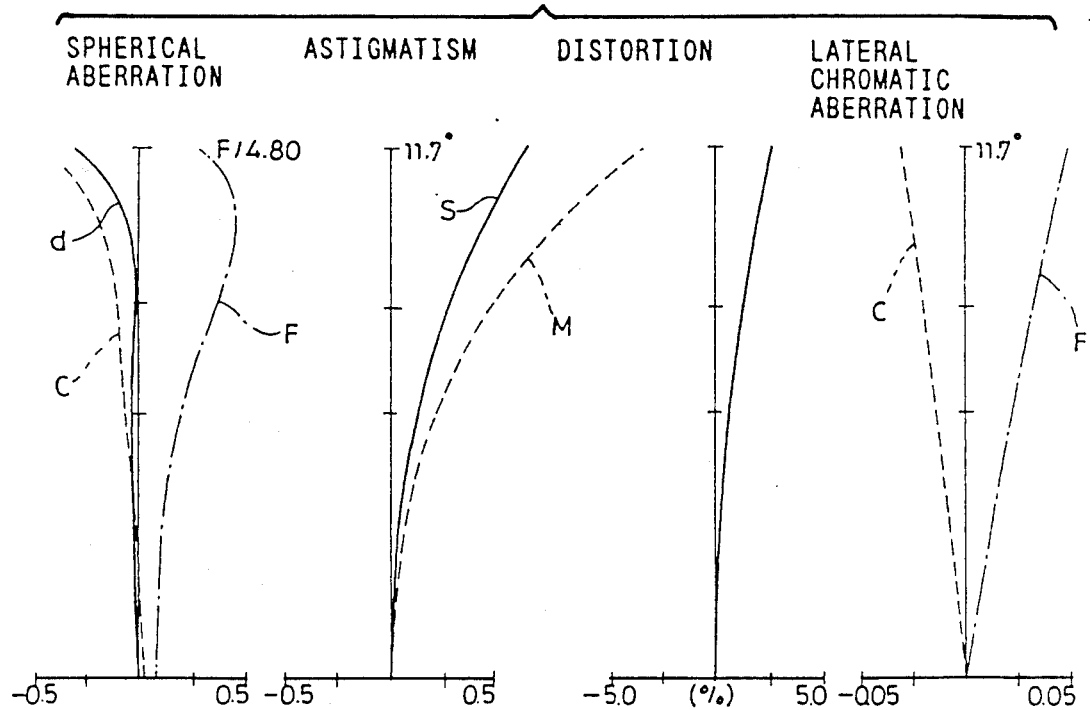

Aberration characteristics at the wide position, intermediate focal length and tele position of the Embodiment 3 are visualized in FIG. 12, FIG. 13 and FIG. 14 respectively.

Figure 4:
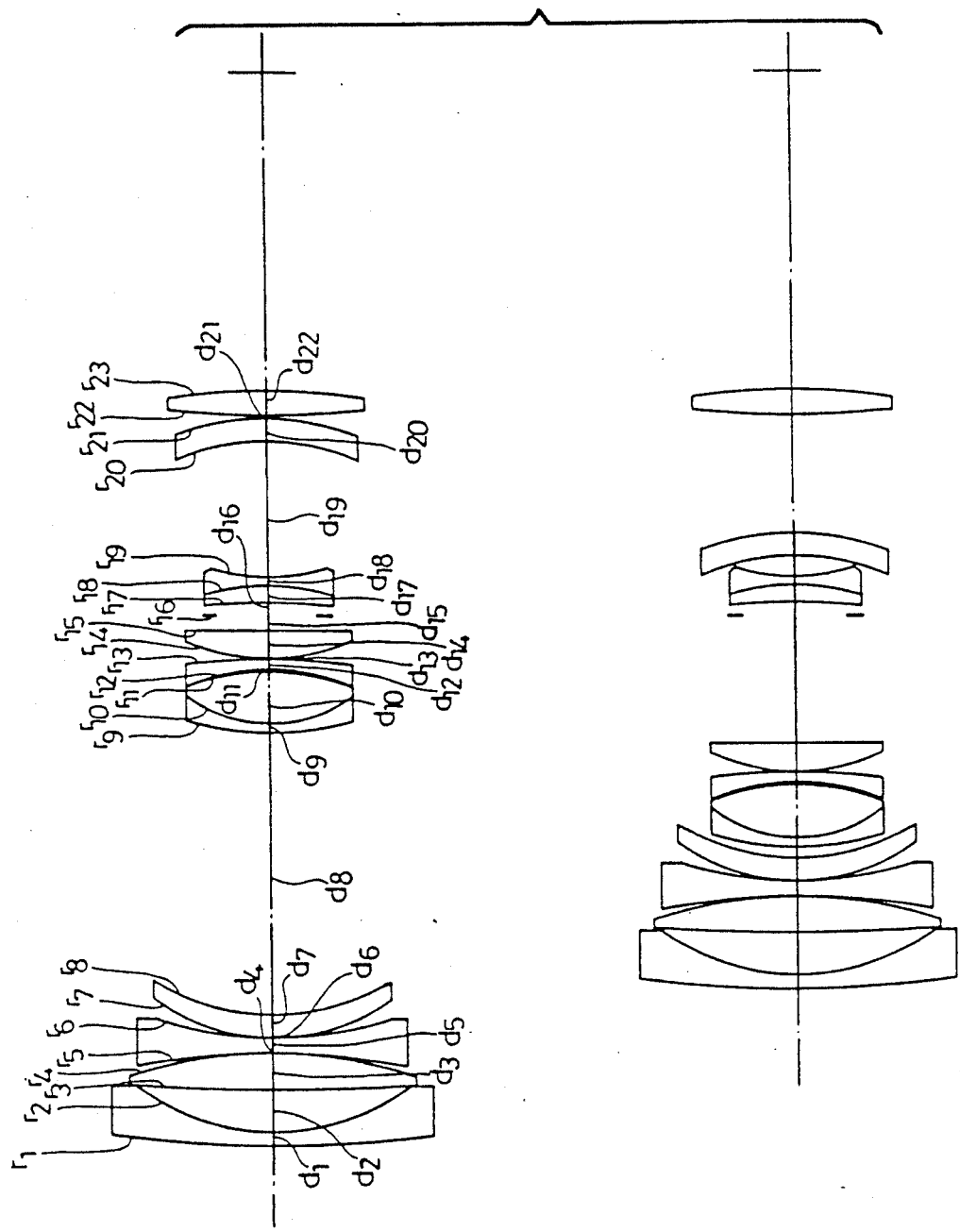

The Embodiment 4 has the composition illustrated in FIG. 4 wherein the zoom lens system consists, in the order from the object side, of five lens units, i.e., a negative lens unit, a positive lens unit, a negative lens unit, a positive lens unit and a positive lens unit. Out of these lens units, the third lens unit and the fifth lens unit are kept fixed. Further, an aperture stop is fixed to the third lens unit, thereby making it possible to simplify the lens barrel structure and obtain a remarkable merit from the viewpoint of manufacturing.

By adopting the radial GRIN lens component having the concave shape and positive power in the Embodiment 4, each of the fourth lens unit and the fifth lens unit thereof can be composed only of a single lens component. That is to say, the Embodiment 4 is a zoom lens system comprising the first negative lens unit, the aperture stop fixed to the third lens unit arranged on the image side of said first lens unit and the radial GRIN lens used as the fourth lens unit arranged on the image side of the aperture stop.

Figure 15:
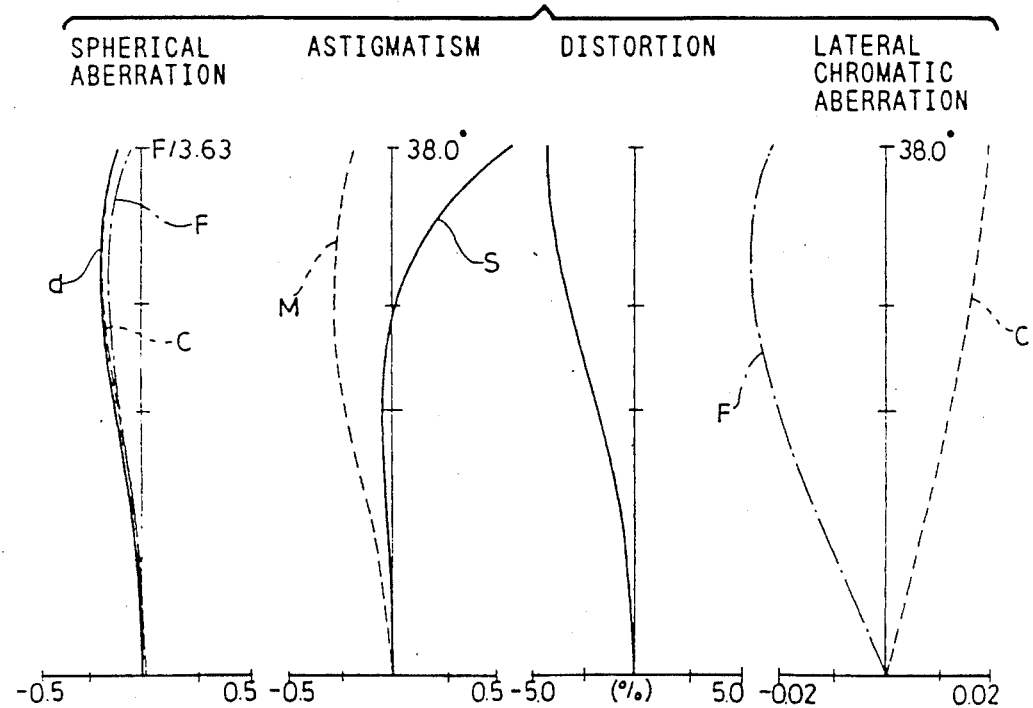

Aberration characteristics at the wide position, intermediate focal length and tele position of the Embodiment 4 are visualized in FIG. 15, FIG. 16 and FIG. 17 respectively.

Figure 5:
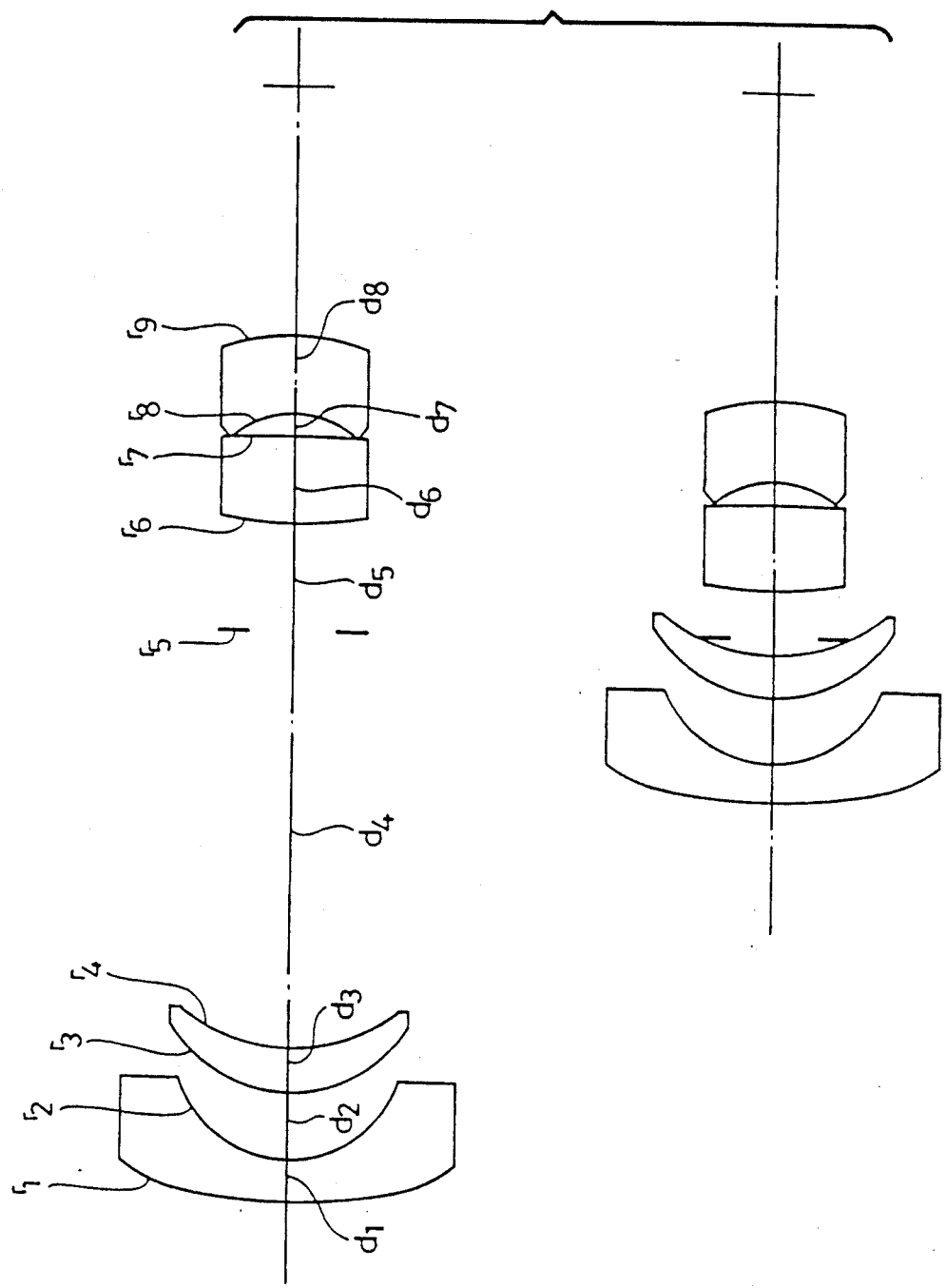

The Embodiment 5 has the composition illustrated in FIG. 5 wherein the zoom lens system consists, in the order from the object side, of two lens units, i.e., a first negative lens unit and a second positive lens unit. The Embodiment 5 has the composition similar to that of the Embodiment 1 but comprises an aperture stop which is fixed between the first lens unit and the second lens unit. The fixed stop provides merits to simplify the lens barrel structure and reduce manufacturing cost. Further, the negative lens component arranged on the object side in the first lens unit has aspherical surfaces on both the sides. That is to say, the Embodiment 5 is a zoom lens system comprising the first lens unit, the aperture stop, and the radial GRIN lens component which is arranged in the second lens unit, and has the concave shape and positive power.

Figure 18:
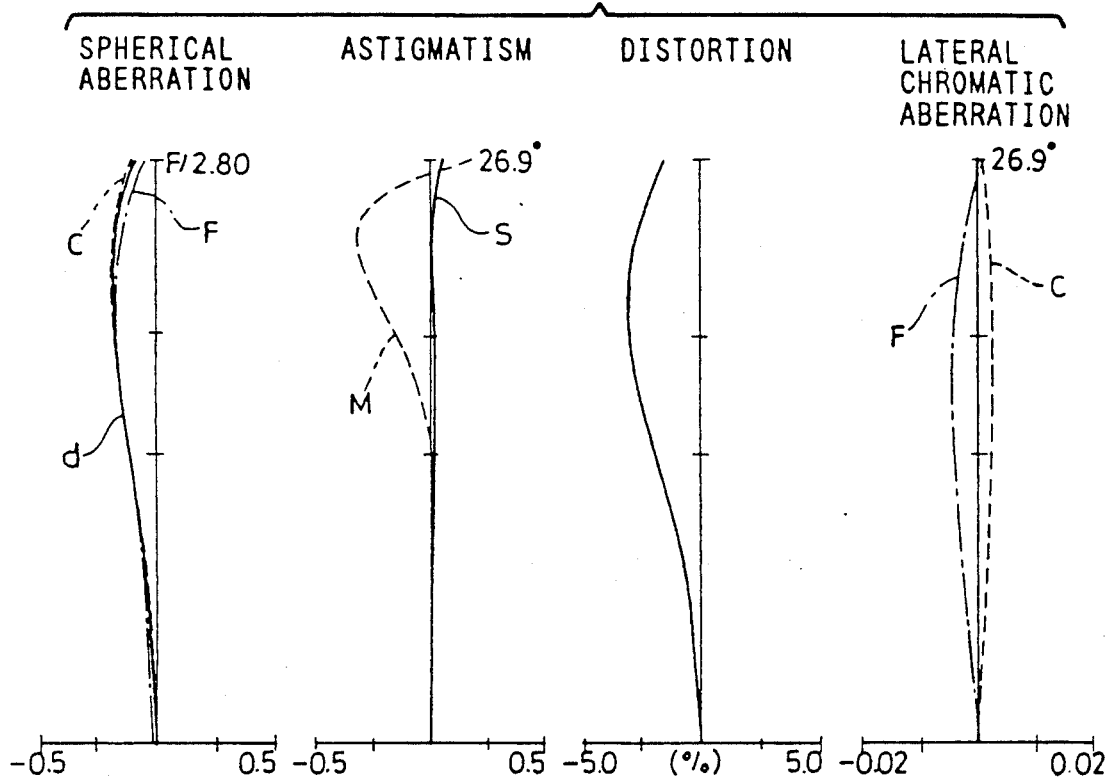
FIG. 18 through FIG. 20 show graphs illustrating aberration characteristics of the Embodiments 5 of the present invention.
Figure 19:
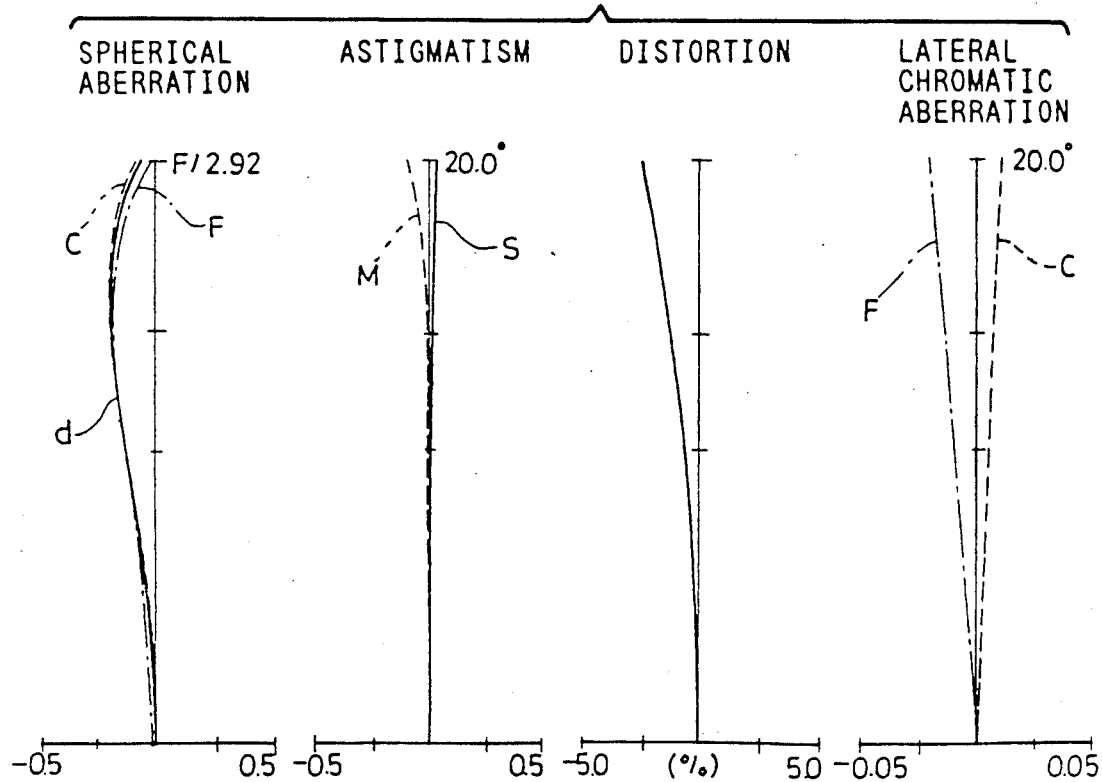
Figure 20:
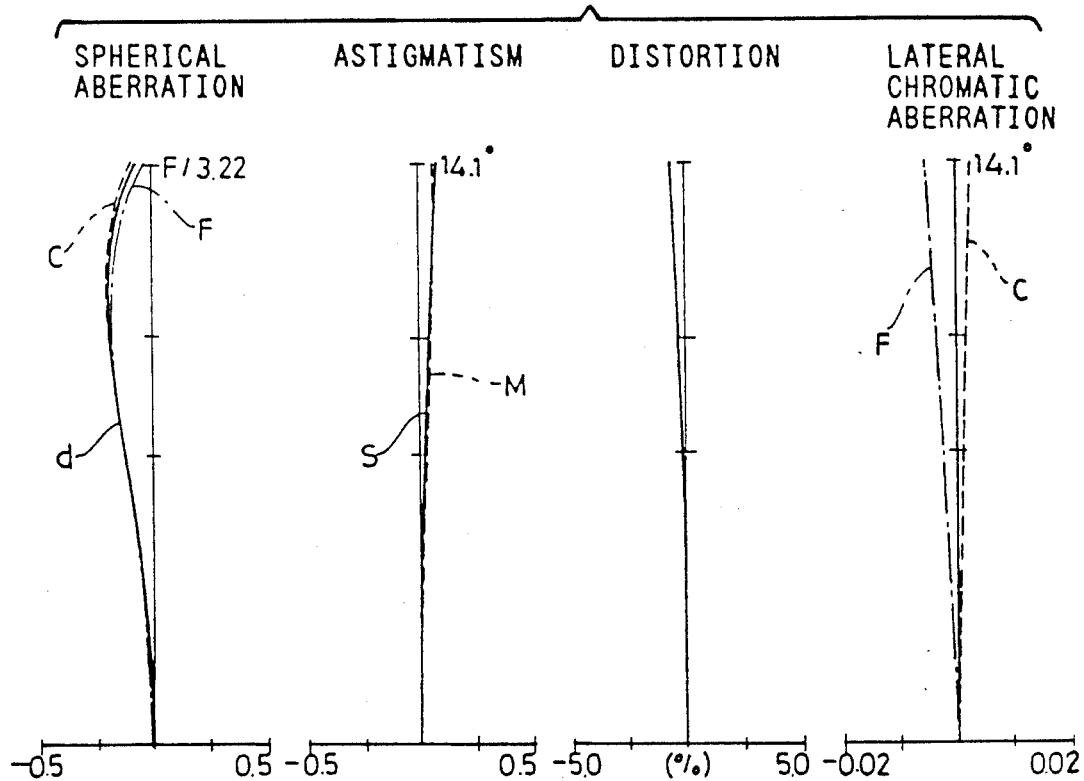

Aberration characteristics at the wide position, intermediate focal length and tele position of the Embodiment 5 are visualized in FIG. 18, FIG. 19 and FIG. 20 respectively.

When the distance as measured in the direction perpendicular to the optical axis is represented by y and refractive index at a radius of y is designated by n(y), refractive index distributions of the radial GRIN lens components used in the Embodiments are expressed by the following formula:

$$n(y) = n_0 + \sum_{i=1}^{n} n_i y^{2i}$$

wherein the reference symbol $n_o$ is refractive index on the optical axis and the reference symbols $n_i$ are coefficients that describe the form of gradient of refractive index.

Further, when the intersection between the optical axis and an aspherical surface is taken as the origin, the x axis is taken as the direction along the optical axis, and the y axis is taken on a plane perpendicular to the optical axis, the aspherical surfaces can be expressed by the following formula:

$$x(y) = \frac{y^2/r}{1 + \sqrt{1 - p(y/r)^2}} + \sum_{i=2}^{n} A_{2i} y^{2i}$$

wherein the reference symbol r represents radius of curvature on the basic spherical surface, the reference symbol p designates the conical constant and the reference symbols $A_{2i}$ denote the aspherical surface coefficients.

What is claimed is:

1. A zoom lens system comprising:
   a plural number of lens units, including a first lens unit on the object side and having negative refractive power and at least one image-side lens unit which is disposed on the image side thereof, separated from one another with an airspace and so adapted as to change the focal length of the zoom lens system as a whole by displacing at least one of said lens units along the optical axis to perform zooming,
   an aperture stop on the image side of said first lens unit, and
   a radial GRIN lens component on the image side of said aperture stop and having (1) a concave surface on its object side, (2) a thickness larger at a marginal portion thereof than that on the optical axis and (3) positive refractive power.

2. A zoom lens system according to claim 1 wherein said radial GRIN lens component satisfies the following conditions (1) and (2):

$$|\phi_s/\phi_w| < 1 \qquad (1)$$

$$|\Delta u| < 10° \qquad (2)$$

wherein the reference symbol $\phi_s$ represents refractive power produced by the surface of said radial GRIN lens component, the reference symbol $\phi_w$ designates refractive power of the zoom lens system as a whole at the wide position thereof and the reference symbol $\Delta_u$ denotes angle of deviation of the principal ray having an image height 0.7 times of the maximum image height at the wide position when it is refracted by said radial GRIN lens component.

3. A zoom lens system according to claim 1 or 2 wherein:
   a second lens unit on the image side of said first lens unit has positive refractive power and comprises said aperture stop and said radial GRIN lens component.

4. A zoom lens system according to claim 1 or 2 wherein:
   a second lens unit having positive refractive power and a third lens unit fixed on the optical axis and having positive refractive power are disposed in the recited order from the object side on the image side of said first lens unit,
   said aperture stop is in said second lens unit, and
   said third lens unit is composed only of said radial GRIN lens component.

5. A zoom lens system according to claim 1 or 2 wherein:
   a second lens unit having positive refractive power, a third lens unit having negative refractive power and a fourth lens unit having positive refractive power are disposed in the recited order from the object side on the image side of said first lens unit,
   said aperture stop is between said second lens unit and said third lens unit, and
   said fourth lens unit is composed only of said radial GRIN lens component.

6. A zoom lens system according to claim 1 or 2 wherein:
   a second lens unit having positive refractive power, a third lens unit having negative refractive power, a fourth lens unit having positive refractive power and a fifth lens unit having positive refractive power are disposed in the recited order from the object side on the image side of said first lens unit,
   said aperture stop is fixed on the optical axis at a location between said second lens unit and said third lens unit,
   said fourth lens unit is composed only of said radial GRIN lens, and
   said third lens units and said fifth lens unit are fixed on the optical axis.

7. A zoom lens system according to claim 1 or 2 comprising:
   a second lens unit on the image side of said first lens unit and having positive refractive power,
   said aperture stop being fixed between said first lens unit and said second lens unit.

* * * * *